United States Patent
Schoenknecht

(10) Patent No.: US 9,899,828 B2
(45) Date of Patent: Feb. 20, 2018

(54) CONTROL UNIT

(75) Inventor: Andreas Schoenknecht, Renningen (DE)

(73) Assignee: Robert Bosch GmbH, Stuttgart (DE)

( * ) Notice: Subject to any disclaimer, the term of this patent is extended or adjusted under 35 U.S.C. 154(b) by 809 days.

(21) Appl. No.: 14/008,427

(22) PCT Filed: Jan. 30, 2012

(86) PCT No.: PCT/EP2012/051436
§ 371 (c)(1),
(2), (4) Date: Sep. 27, 2013

(87) PCT Pub. No.: WO2012/130498
PCT Pub. Date: Oct. 4, 2012

(65) Prior Publication Data
US 2014/0015316 A1    Jan. 16, 2014

(30) Foreign Application Priority Data

Mar. 31, 2011 (DE) ........................ 10 2011 006 512

(51) Int. Cl.
| | | |
|---|---|---|
| *H02H 9/00* | (2006.01) | |
| *B60L 3/04* | (2006.01) | |
| *B60L 7/06* | (2006.01) | |
| *B60L 11/14* | (2006.01) | |
| *H02P 3/22* | (2006.01) | |
| *B60L 3/00* | (2006.01) | |

(52) U.S. Cl.
CPC .............. *H02H 9/00* (2013.01); *B60L 3/003* (2013.01); *B60L 3/04* (2013.01); *B60L 7/06* (2013.01);
(Continued)

(58) Field of Classification Search
CPC .. B60L 11/14; B60L 3/003; B60L 3/04; B60L 7/06; B60L 2210/40; H02H 9/00;
(Continued)

(56) References Cited

U.S. PATENT DOCUMENTS

| | | | |
|---|---|---|---|
| 6,239,566 B1 | 5/2001 | Tareilus et al. | |
| 8,441,224 B2 * | 5/2013 | Sumi ........................ | B60L 3/04 |
| | | | 180/65.265 |

(Continued)

FOREIGN PATENT DOCUMENTS

| | | |
|---|---|---|
| CN | 101512891 | 8/2009 |
| CN | 101997442 | 3/2011 |

(Continued)

OTHER PUBLICATIONS

International Search Report for Application No. PCT/EP2012/051436 dated Apr. 8, 2013 (2 pages).

*Primary Examiner* — Rexford Barnie
*Assistant Examiner* — Thai Tran
(74) *Attorney, Agent, or Firm* — Michael Best & Friedrich LLP

(57) ABSTRACT

The invention relates to a control unit (40) for driving an electric load, in particular an electric machine, having a first and a second voltage terminal (46, 48) in order to supply the control unit (40) with electrical energy, a capacitor (58), which is connected between the voltage terminals (46, 48), at least one half-bridge (15), which is connected between the voltage terminals (46, 48), wherein the half-bridge (50) has two controllable switches (52, 54), between which there is formed a half-bridge tap (50) for connecting the load, a safety circuit (66), which is designed to close one of the controllable switches (52, 54) of the half-bridge (50) in the event of a fault, a discharge circuit (68), which is designed to connect the voltage terminals (46, 48) electrically in the event of a fault, and having a control circuit (18) which is designed to provide a control signal (78) which triggers the safety circuit (66) and the discharge circuit (68) in the event of the detected fault.

11 Claims, 2 Drawing Sheets

(52) U.S. Cl.
CPC ............... *B60L 11/14* (2013.01); *H02P 3/22* (2013.01); *B60L 2210/40* (2013.01); *Y02T 10/642* (2013.01); *Y02T 10/70* (2013.01); *Y02T 10/7077* (2013.01); *Y02T 10/7241* (2013.01)

(58) Field of Classification Search
CPC .. H02H 7/122; H02H 9/04; H02P 3/22; H02P 27/06; H02P 3/18; Y02T 10/642; H02M 7/48
USPC ....................................................... 307/10.1
See application file for complete search history.

(56) References Cited

U.S. PATENT DOCUMENTS

| | | | |
|---|---|---|---|
| 2004/0227193 | A1* | 11/2004 | Lee ................... H03K 17/0822 257/393 |
| 2009/0118916 | A1* | 5/2009 | Kothari ................. B60K 6/445 701/53 |
| 2009/0224706 | A1 | 9/2009 | Jobard |
| 2010/0079093 | A1* | 4/2010 | Kitanaka ................ B60L 3/003 318/400.3 |
| 2011/0050136 | A1* | 3/2011 | Sumi ........................ B60L 3/04 318/400.3 |
| 2011/0278918 | A1* | 11/2011 | Shindo .................. B60L 3/0007 307/9.1 |
| 2013/0033914 | A1* | 2/2013 | Yahata .................... H02M 7/48 363/132 |

FOREIGN PATENT DOCUMENTS

| | | |
|---|---|---|
| DE | 19835576 | 11/1999 |
| DE | 102006003254 | 7/2007 |
| JP | 2004056956 | 2/2004 |
| JP | 2010200490 | 9/2010 |

* cited by examiner

CONTROL UNIT

BACKGROUND OF THE INVENTION

The present invention relates to a control unit for driving an electric load, in particular an electric machine, having a first and a second voltage terminal in order to supply the control unit with electrical energy, a capacitor, which is connected between the voltage terminals, at least one half-bridge, which is connected between the voltage terminals, wherein the half-bridge has two controllable switches, between which there is formed a half-bridge tap for connecting the load, a safety circuit, which is designed to close one of the controllable switches of the half-bridge in the event of a fault, and a discharge circuit, which is designed to connect the voltage terminals electrically in the event of a fault.

The present invention further relates to a method for initiating a safety mode of a control unit for driving an electric load, in particular an electric machine, wherein the control unit has a first and a second voltage terminal in order to supply the control unit with electrical energy, a capacitor, which is connected between the voltage terminals, at least one half-bridge, which is connected between the voltage terminals, wherein the half-bridge has two controllable switches, between which there is formed a half-bridge tap for connecting the load. Said method comprises the steps: detecting a fault, closing a controllable switch of the half-bridge by means of a safety circuit and connecting the voltage terminals electrically by means of a discharge circuit.

Finally, the present invention relates to a drive train of a motor vehicle comprising an electric machine for providing the driving power, an energy supply unit for providing electrical energy and a control unit of the kind described above for driving the electric machine.

In the field of automotive drive technology, it is universally known to use an electric machine as the sole drive or jointly with a drive motor of another type (hybrid drive). Power electronics, which include a power inverter that converts the DC voltage/DC current of a battery situated on-board of the motor vehicle into an AC current, serve to drive such electrical machines in a motor vehicle.

Known power inverters comprise a plurality of switching elements, with which the individual phases of the electric machine are connected to a high supply voltage potential or to a low supply voltage potential. In so doing, two switching elements are each interconnected in series to a half-bridge, wherein a half-bridge tap is formed between the switching elements, at which tap the respective phase of the electrical machine is connected.

In the event of a fault, e.g. due to too high a battery current or too high a supply current, the power inverter is switched into a safe state in order to prevent possible damage to the electrical components. Essentially two different power-off methods are known from the prior art which are used alternatively. In the first method, individual or all of the controllable switches which are connected to the low supply voltage potential (low-side switches) are closed. This operating mode is also designated as the short-circuit mode. In the other power-off method the voltage terminals of the power inverter are connected to one another via an electrical resistor in order to produce a discharge of the intermediate circuit capacitor of the power inverter. Such a discharge circuit can be selectively implemented as a permanently energized discharge, which however permanently converts energy from the intermediate circuit capacitor into heat and therefore leads to a reduced degree of efficiency, or even implemented as a discharge circuit which can be switched on or switched off and which must be activated, for example, if an opening of the traction network connector is recognized.

The German patent application DE 10 2006 003 254 A1 discloses a method for operating an electric machine with a pulse width modulated inverter in the event of a fault, in which method the electric machine is initially switched into a disconnected mode and subsequently into a short-circuit mode.

A disadvantage of the known power-off methods is that the individual disconnections are activated using different triggering criteria and therefore require considerable technical complexity, high costs and large installation space.

It is therefore the aim of the present invention to provide an improved control unit for driving an electric load, which control unit can be switched into a safe state with less technical complexity. It is further the aim of the present invention to provide a corresponding method.

SUMMARY OF THE INVENTION

According to the invention, this aim is met with the control unit stated at the beginning of the application by virtue of the fact that provision is made for a control circuit that is designed to provide a control signal which triggers the safety circuit and the discharge circuit in the event of a detected fault.

In addition, the aforementioned aim of the method specified above is met by virtue of the fact that the safety circuit and the discharge circuit are triggered by a signal which is provided by a control circuit.

Finally the aim mentioned above is met by means of a drive train of a motor vehicle comprising an electric machine for providing the driving power, an energy supply unit for providing electrical energy and a control unit of the type specified above for driving the electric machine.

By means of the present invention, a switch-off of a power inverter can be provided which is implemented with a reduced number of actuations. This results from the fact that the one control circuit actuates or, respectively, triggers the emergency discharge circuit as well as the safety circuit and thus a separate control can be eliminated. In so doing, costs and installation space for the control unit can be considerably reduced.

The discharge circuit preferably comprises a resistor and a controllable switch, wherein the resistor and the controllable switch are connected in series between the voltage terminals.

The intermediate circuit capacitor can thereby be discharged with simple means and the stored energy can be converted to heat in the resistor.

It is furthermore preferred that the safety circuit comprises a controllable switch which is designed to connect the first voltage terminal to a voltage input of the connected controllable switch.

The controllable switch of the half-bridge can thereby be closed using simple means, wherein the corresponding voltage or, respectively, electrical energy for actuating the switch out of the traction network can be used at the same time, whereby energy is additionally led away from the traction network.

It is furthermore preferred that the control circuit is designed to trigger the safety circuit and the discharge circuit substantially at the same time.

In so doing, the resistor of the emergency discharge circuit can be dimensioned smaller because the safety circuit extracts a portion of the energy of the traction network by actuating the controllable switch.

It is generally preferred that the control unit comprises a high-voltage section and a low-voltage section, wherein the high-voltage section has a supply voltage which is greater than a supply voltage of the low-voltage section and wherein the high-voltage section is galvanically isolated from the low-voltage section.

In so doing, components of the control unit can be used from other control units having a low supply voltage without additional voltage converters being required.

It is thereby preferred that the control circuit is associated with the high-voltage section.

The control signal of the safety circuit and the discharge circuit can thereby be directly provided without a galvanic isolation having to be overcome, whereby the shut-down speed is not delayed.

It is furthermore generally preferred that the control circuit is connected to detection means which are designed to monitor at least one function of the control unit.

Possible malfunctions of the control unit can thereby be continually monitored.

It is thereby particularly preferred that the control circuit is connected via signal transmission means to the detection means of the low-voltage section, wherein the detection means are designed to monitor at least one function of the low-voltage section.

In so doing, malfunctions of the low-voltage section of the control unit can also be taken into account.

It is generally preferred that the first voltage terminal is associated with a high voltage potential and the second voltage terminal with a low voltage potential, wherein the switch which can be actuated by the safety circuit is connected to the low voltage potential.

High induction currents which can possibly occur can thereby be quickly and simply discharged, whereby the entire control unit can be brought more quickly into a safe state.

It goes without saying that the features, properties and advantages of the inventive control unit also accordingly pertain to or apply to the inventive method.

DETAILED DESCRIPTION

Figure 1:
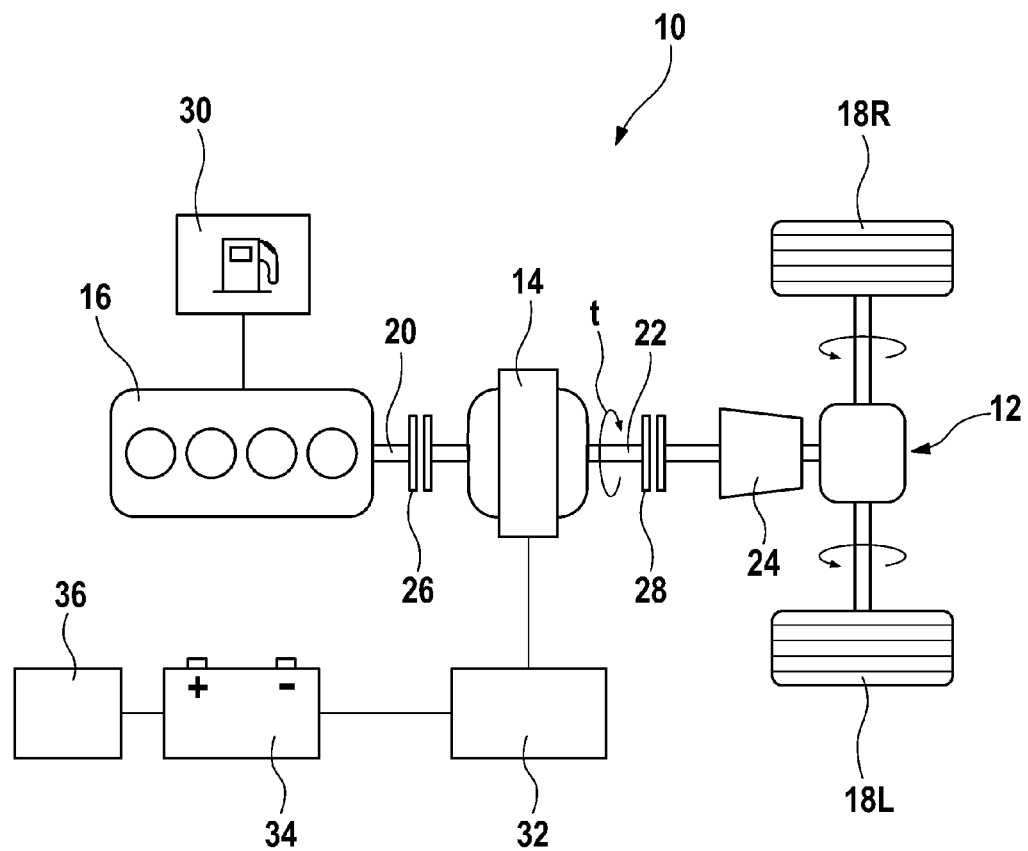
FIG. 1 shows in schematic depiction a motor vehicle having a hybrid drive train which comprises a combustion engine or an electric machine.

A motor vehicle is depicted in FIG. 1 and generically denoted with the reference numeral 10. The motor vehicle 10 comprises a drive train 12, which in the present case includes an electric machine 14 and a combustion engine 16 for providing driving power. The drive train 12 serves to drive the wheels 18L, 18R of the vehicle 10.

The combustion engine 16 is connected or can be connected via a crankshaft 20 to the electric machine 14, wherein said combustion engine 16 and the electric machine 14 provide a torque t at an output shaft 22 which rotates at an adjustable rotational speed. The output shaft 22 is connected or can be connected to a transmission unit 24 in order to transmit the torque t to the wheels 18R, 18L to be driven. The crankshaft 20 and the output shaft 22 each have a clutch 26, 28 in the present case in order to connect the combustion engine 16 to the electric machine 14 or, respectively, the electric machine 14 to the transmission unit 24.

The drive train 12 can be equipped to drive the vehicle 10 solely by means of the electric machine 16 (electric vehicle). Alternatively, the electric machine 16 as in the present case can be part of a hybrid drive train 12.

The crankshaft 20 is connected or can be connected by means of the clutch 26 to a rotor of the electric machine in order to transmit a rotational speed or more precisely a torque to the electric machine 14. The rotor of the electric machine 14 is connected to the output shaft 22 in order to transmit the torque t to the transmission unit 24. The torque t is thereby formed by the sum of the individual torques supplied by the combustion engine 16 and the electric machine 14.

During the motor operating mode, the electric machine 14 generates a driving torque which supports the combustion engine, for example in an acceleration phase. In the generator operating mode or, respectively, recuperation operation, the electric machine 14 generates electrical energy, which is universally made available to the vehicle 14.

The combustion engine 16 is supplied with fuel by a fuel tank 30.

The electric machine 14 can be of single or multi-phase configuration and is driven by means of power electronics 32 or, respectively, a power inverter 32 and is supplied with electrical energy. The power electronics 32 are connected to an energy supply unit 34, such as a DC power supply (e.g. accumulator or battery) 34 of the vehicle 10 and serve to convert a voltage supplied by the energy supply unit 34 into alternating current in general or into a number of phase currents for the phases of the electric machine 14. The energy supply unit 34 is connected to a battery control device 36 which is designed to control the energy supply of the electric machine 14 via the power electronics 32 and the state of charge of the energy supply unit 34. The power electronics 32 are furthermore designed to charge the energy supply unit 34 with the electrical energy generated by the electric machine 14 during the recuperation operation of said electric machine 14.

Figure 2:
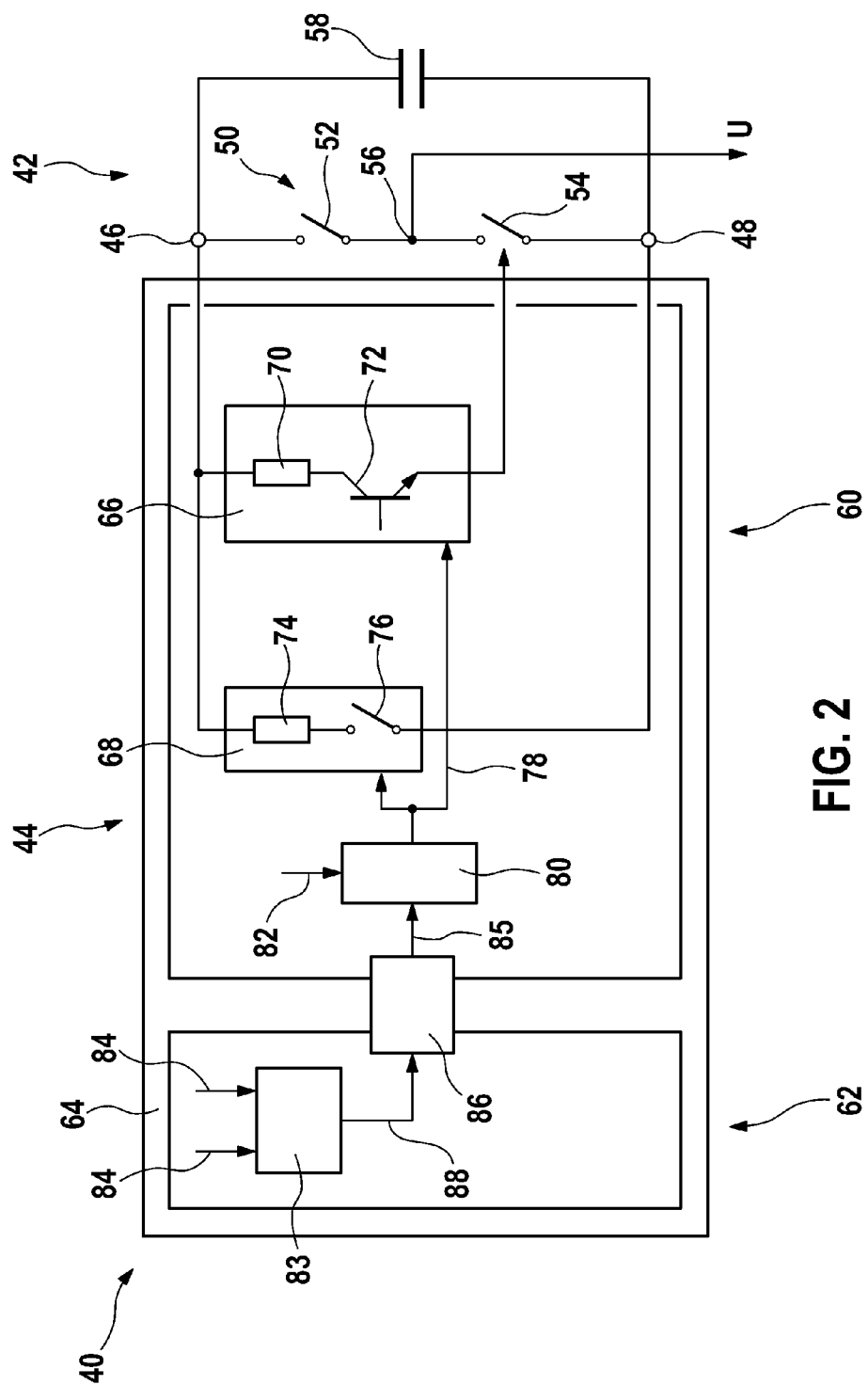
FIG. 2 shows in schematic depiction a circuit diagram of a control unit for driving an electric machine comprising an emergency discharge circuit and a safety circuit.

A control unit for driving the electric machine 14 is shown in FIG. 2 and generically denoted with the reference numeral 40. The control unit generally comprises a power branch 42 and a control branch 44. The power branch 42 has two voltage terminals 46, 48 for connecting the control unit 40 to a DC power source that is not depicted. The power branch 42 generally comprises a half-bridge 50 having two controllable switches 52, 54, between which there is formed a half-bridge tap 56 for connecting a phase U of the electric machine 14. An intermediate circuit capacitor 58 is connected in parallel to the voltage terminals 46, 48.

The control branch 44 comprises a high-voltage section 60 and a low-voltage section 62. In relation to the voltage supply, the high-voltage section 60 is as a rule associated with the high-voltage on-board network of the motor vehicle 10, wherein the low-voltage section 62 is as a rule associated with a low-voltage on-board network of the motor vehicle 10. The reference potential of the low-voltage section 62 is typically a body ground of the motor vehicle 10. The high-voltage section 60 and the low-voltage section 62 are implemented on a printed circuit board 64.

The high-voltage section 60 comprises a safety circuit 66 and a discharge circuit 68 for switching the control unit 40 into a safe state in the event of a fault. The safety circuit 66 comprises a resistor 70 and a controllable switch 72 and is connected electrically to the voltage terminal 46 which lies at a high voltage potential of the high-voltage on-board network. The safety circuit 66 is connected to a control input of the controllable switch 54 of the half-bridge 50. The controllable switch 54 is connected to a low voltage potential of the high-voltage on-board network. The controllable switches 52, 54 are at a control voltage of 0V in a blocked state and are switched on at a corresponding positive control voltage. Provided the controllable switch 72 of the safety circuit 66 is closed, the control input of the controllable switch 54 is connected to the high voltage potential of the on-board network or, respectively, to the voltage terminal 46, whereby the controllable switch 54 is closed or that is to say switched on. In so doing, the phase U is connected to the low potential of the high-voltage on-board network, whereby, e.g., induction currents of the electric machine 14 can be discharged quickly and safely. The short circuiting of the controllable switch 54 is also referred to as emergency active short circuit. The controllable switches 52, 54 are preferably embodied as IGBTs or as MOSFETs. As a result of said controllable switches 52, 54 being switched by the voltage supply of the high-voltage on-board network in the event of an emergency active short circuit, the emergency active short circuit is also operable in the event of a breakdown of the low-voltage on-board network. As a result of the emergency active short circuit being activated and maintained by the high-voltage on-board network, additional energy is extracted from the high-voltage on-board network and in particular from the intermediate circuit capacitor 58, whereby the control unit 40 is transferred faster and more reliably to a safe state.

The discharge circuit 68 comprises a resistor 74 and a controllable switch 76. The discharge circuit is connected to the voltage terminals 46, 48 of the power branch 42. The discharge circuit is designed to short circuit the voltage terminals 46, 48 in the event of a malfunction of the control unit 40 and in so doing to convert the electrical energy stored in the intermediate circuit capacitor 58 into heat in the resistor 74.

The safety circuit 66 and the discharge circuit 68 are actuated by means of a control signal 78 from a control circuit 80 or, respectively, an evaluation circuit 80. All signals of the high-voltage section 60, which, for example, are detected by detection means that are not depicted, are connected directly to the control circuit 80 and are denoted generically by the reference numeral 82. Provided the control circuit 80 detects a malfunction by means of the signals 82, said control circuit 80 transmits the control signal 78 to the safety circuit 66 and also to the discharge circuit 68. The safety circuit 66 as well as the discharge circuit 68 is correspondingly activated or triggered by the control signal 78. As an alternative to the signals 82, signals 85 of the low-voltage section 62 can also be supplied to the control circuit 80 and signalize a corresponding malfunction. To this end, a circuit 83 is formed at the low-voltage section 62, which circuit is preferably embodied as a microcontroller. The circuit 83 detects signals of the low-voltage section, which are denoted in FIG. 2 generically with the reference numeral 84. The circuit 83 is connected to the signal transmitter 86. The signal transmitter 86 is designed to transmit signals from the low-voltage section 62 to the high-voltage section 60 in a potential-free manner. The signal transmitter 86 can be embodied as an optocoupler. The circuit 83 transmits a corresponding signal 88 to the signal transmitter 86 which is connected to the control circuit 80. Provided a malfunction is determined in the low-voltage section 62, the control circuit 80 transmits the control signal 78 to the safety circuit 66 and the discharge circuit 68 in order to correspondingly activate or trigger the same.

As a result of the safety circuit 66 and the discharge circuit 68 being activated or triggered by the one control signal 78, different separate actuations of the safety circuit 66 and the discharge circuit 68 can be as a rule eliminated. In addition, the discharge circuit 68 can be dimensioned correspondingly smaller. This results from the fact that energy is extracted from the high-voltage on-board network or, respectively, from the intermediate circuit capacitor 58 simultaneously with the activation of the discharge circuit 68 and also by means of the emergency active short circuit and therefore less electrical energy has to be converted to heat in the resistor 74. The technical complexity of the control unit 40 according to the invention with respect to the prior art is furthermore reduced because, for example, separate signal transmitters 86 for the safety circuit 66 and the discharge circuit 68 can be eliminated.

The invention claimed is:

1. A control unit for driving an electric load, the control unit comprising:
   a low voltage section including a microcontroller and a first portion of a signal transmitter;
   a high voltage section including a second portion of the signal transmitter, a safety circuit, a discharge circuit, a control circuit, a first voltage terminal and a second voltage terminal in order to supply the control unit with electrical energy;
   a capacitor, which is connected between the first voltage terminal and the second voltage terminals;
   at least one half-bridge, which is connected between the first voltage terminal and the second voltage terminals, wherein the half-bridge includes a first controllable switch and a second controllable switch, between which there is formed a half-bridge tap for connecting the load;
   wherein the safety circuit is configured to receive a control signal from the control circuit and to close one of the first controllable switch and the second controllable switch of the half-bridge in the event of a fault, the safety circuit including a third controllable switch and a resistor;
   wherein the discharge circuit is designed to connect the first voltage terminal and the second voltage terminals electrically in the event of the fault;
   wherein the control circuit is coupled to the safety circuit and the discharge circuit and designed to provide the control signal to trigger the safety circuit and the discharge circuit in the event of the fault; and
   wherein the control circuit is designed to trigger the safety circuit and the discharge circuit substantially at the same time.

2. The control unit according to claim 1, wherein the discharge circuit comprises a resistor and a fourth controllable switch, wherein the resistor and the controllable switch are connected in series between the voltage terminals.

3. The control unit according to claim 1, wherein the third controllable switch is designed to connect the first voltage terminal to a control input of the second controllable switch.

4. The control unit according to claim 1, wherein the control unit comprises the high-voltage section and the low-voltage section, wherein the high voltage section has a supply voltage which is greater than a supply voltage of the low-voltage section and wherein the high-voltage section is galvanically isolated from the low-voltage section.

5. The control unit according to claim 4, wherein the control circuit is associated with the high-voltage section.

6. The control unit according to claim 5, wherein the control circuit is connected via signal transmission means to detection means of the low-voltage section, wherein the detection means are designed to monitor at least one function of the low-voltage section.

7. The control unit according to claim 1, wherein the control circuit is connected to a detector designed to monitor at least one function of the control unit.

8. The control unit according to claim 1, wherein the first voltage terminal is associated with a high voltage potential and the second voltage terminal is associated with a low voltage potential, wherein the second controllable switch which can be actuated by the safety circuit is connected to the second voltage terminal.

9. A drive train of a motor vehicle comprising an electric machine for providing driving power, an energy supply unit for providing electrical energy and the control unit according to claim 1 for driving the electric machine.

10. The control unit according to claim 1, wherein the control circuit comprises an optocoupler configured to galvanically isolate the high-voltage section from the low-voltage section, wherein the high voltage section has a supply voltage which is greater than a supply voltage of the low-voltage section.

11. A method for initiating a safety mode of a control unit for driving an electric load, wherein the control unit includes a high voltage section, a low voltage section and has a first and a second voltage terminal in order to supply said control unit with electrical energy, a capacitor, which is connected between the voltage terminals, at least one half-bridge, which is connected between said voltage terminals, wherein the half-bridge includes a first controllable switch and a second controllable switch, between which there is formed a half-bridge tap for connecting the load, said method comprising the steps:

detecting a fault, closing one of the first controllable switch and the second controllable switch of the half-bridge by means of a safety circuit, triggering both the safety circuit and a discharge circuit with a control signal from a control circuit, connecting the voltage terminals electrically by means of the discharge circuit, and wherein the control circuit is designed to trigger the safety circuit and the discharge circuit substantially at the same time.

* * * * *